United States Patent
Sheth et al.

(10) Patent No.: US 9,701,867 B2
(45) Date of Patent: Jul. 11, 2017

(54) POLYUREA COATINGS CONTAINING SILANE

(71) Applicant: PPG Industries Ohio, Inc., Cleveland, OH (US)

(72) Inventors: Kamlesh Sheth, Suwanee, GA (US); James McCarthy, Roswell, GA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/541,612

(22) Filed: Nov. 14, 2014

(65) Prior Publication Data

US 2015/0072154 A1      Mar. 12, 2015

Related U.S. Application Data

(63) Continuation of application No. 13/537,190, filed on Jun. 29, 2012, now Pat. No. 8,889,259.

(60) Provisional application No. 61/503,779, filed on Jul. 1, 2011.

(51) Int. Cl.
| | |
|---|---|
| *C09D 175/02* | (2006.01) |
| *C08G 18/10* | (2006.01) |
| *C08G 18/32* | (2006.01) |
| *C08G 18/38* | (2006.01) |
| *C08G 18/71* | (2006.01) |

(52) U.S. Cl.
CPC .......... *C09D 175/02* (2013.01); *C08G 18/10* (2013.01); *C08G 18/3256* (2013.01); *C08G 18/3821* (2013.01); *C08G 18/718* (2013.01); *Y10T 428/31554* (2015.04); *Y10T 428/31598* (2015.04); *Y10T 428/31605* (2015.04); *Y10T 428/31609* (2015.04)

(58) Field of Classification Search
CPC   C08G 18/10; C08G 18/3256; C08G 18/3821; C08G 18/718; C09D 175/02; Y10T 428/31554; Y10T 428/31598; Y10T 428/31605; Y10T 428/31609
USPC .... 428/423.3, 425.8, 425.9; 427/387, 388.1; 524/588, 589
See application file for complete search history.

(56) References Cited

U.S. PATENT DOCUMENTS

| | | | | |
|---|---|---|---|---|
| 5,466,771 A | * | 11/1995 | Hicks et al. | ..................... 528/64 |
| 5,726,272 A | * | 3/1998 | Yonek | .................... C08G 18/10 |
| | | | | 528/52 |
| 7,736,745 B2 | * | 6/2010 | Hong | .......................... 428/423.1 |
| 8,889,259 B2 | * | 11/2014 | Sheth et al. | ............... 428/423.3 |
| 2002/0119330 A1 | * | 8/2002 | Roesler et al. | ................ 428/447 |
| 2003/0105220 A1 | * | 6/2003 | Gupta et al. | ................... 524/589 |
| 2005/0106395 A1 | * | 5/2005 | Asher | ......................... 428/423.1 |
| 2006/0172074 A1 | * | 8/2006 | DiLoreto | ........... C08G 18/3821 |
| | | | | 427/421.1 |
| 2008/0146381 A1 | * | 6/2008 | Kondos | .............. A63B 37/0003 |
| | | | | 473/378 |
| 2013/0203934 A1 | * | 8/2013 | Best | ................... C08G 18/3821 |
| | | | | 524/589 |

FOREIGN PATENT DOCUMENTS

EP       2 305 691 A1     4/2011

* cited by examiner

*Primary Examiner* — Thao T Tran
(74) *Attorney, Agent, or Firm* — Lisa Geary

(57) ABSTRACT

The present invention is directed to a polyurea coating composition formed from an amine-functional component and an isocyanate-functional component. The amine-functional component can include an aspartic ester-based amine-functional resin and a blocked primary amine. The isocyanate-functional component can include a polyisocyanate having a functionality greater than 2.0 and an isocyanate equivalent weight of greater than 300, and a silane.

12 Claims, No Drawings

POLYUREA COATINGS CONTAINING SILANE

CROSS-REFERENCE TO RELATED APPLICATIONS

The present application is a continuation application of U.S. patent application Ser. No. 13/537,190, filed Jun. 29, 2012, entitled "Polyurea Coatings Containing Silane", now allowed, which claims priority to U.S. Provisional Application No. 61/503,779, filed on Jul. 1, 2011, entitled "Compositions that Form Polyurea Coatings", the entire disclosure of which is herein incorporated by reference.

FIELD OF THE INVENTION

The present invention relates to coating compositions that form polyurea coatings, as well as methods for their use, and the resulting polyurea coating layers.

BACKGROUND OF THE INVENTION

Considerable efforts have been expended to develop coating compositions with improved performance (both protective and aesthetic) properties. Polyurea coatings have been among the coatings commercially applied to various substrates to provide protection to the substrates and to improve properties of the substrates. Polyurea compositions have been used as protective coatings in industrial applications for coating of process equipment to provide corrosion resistance or as caulks and sealants in a variety of aggressive environments.

However, certain prior art polyurea coatings have been known to have deficiencies that inhibit their effectiveness in providing adequate protection to the substrate or to improve properties of the substrate. For example, known polyurea coating compositions may have relatively high viscosity that inhibits flow over the substrate or other underlying coating compositions. They may also have limited pot-life due to the high level of reactivity between the isocyanate component and the amine component. Also, certain polyurea coating compositions may have poor adhesion properties to a previously applied coating or to the substrate itself and/or exhibit poor durability upon prolonged exposure to ultraviolet radiation and/or humidity conditions.

Accordingly, it is desirable to provide polyurea coating compositions that may enhance adhesion to previously applied coatings or to the substrate, and/or have a relatively lower viscosity that improves the flowable state of the coating composition for a longer period of time.

SUMMARY OF THE INVENTION

In certain respects, the present invention is directed to coating compositions. The compositions comprise: (a) an amine-functional component comprising (i) an aspartic ester-based amine-functional resin; and (ii) a blocked primary amine; and (b) an isocyanate-functional component comprising: (i) a polyisocyanate having a functionality greater than 2.0 and an isocyanate equivalent weight of greater than 300; and (ii) a silane.

In other respects, the present invention is directed to composite coating systems. These coating systems comprise: (a) a first coating layer deposited from a composition comprising at least 70% by weight zinc, based on the total solids, i.e., non-volatile, weight of the composition; and (b) a second coating layer deposited over at least a portion of the first coating layer, the second coating layer comprising the cured reaction product of a composition comprising: (a) an amine-functional component comprising (i) an aspartic ester-based amine-functional resin; and (ii) a blocked primary amine; and (b) an isocyanate-functional component comprising: (i) a polyisocyanate having a functionality greater than 2.0 and an isocyanate equivalent weight of greater than 300; and (ii) a silane.

The present invention is also directed to, inter alia, substrates at least partially coated with a coating deposited from such compositions and/or composite coating systems, methods of making such compositions, and methods of at least partially coating a substrate with such compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, moieties in a general chemical formula and quantities of ingredients used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, certain embodiments of the present invention are directed to coating compositions. In certain embodiments, the coating compositions of the present invention are embodied in the form of a two-component system, wherein the ingredients are provided in two separate containers that are combined and mixed together prior to use. For example, in certain embodiments, the coating compositions of the present invention are embodied as a two-component system, wherein a first component comprises an amine-functional component and a second component comprises an isocyanate-functional component.

In the coating compositions of the present invention, the amine-functional component comprises an aspartic ester-based amine-functional resin. It is desired that the aspartic ester-based amine-functional resin be compatible with isocyanates; e.g., one that is solvent free, and/or has a mole ratio of amine functionality to the ester of no more than 1:1 so there remains no excess primary amine upon reaction. One example of such polyaspartic esters is the derivative of diethyl maleate and 1,5-diamino-2-methylpentane, available commercially from Bayer Corporation of Pittsburgh, Pa. under the trade name DESMOPHEN NH1220. Examples of other suitable polyaspartic esters are DESMOPHEN® NH1200, NH1420, NH1521, NH1520, or PAC XP2528.

As previously indicated, the amine-functional component of the coating compositions of the present invention also comprise a blocked primary amine, such as an aldimine or ketimine. Aldimines for use in the present invention include those obtained by the reaction of an amine with either a ketone or an aldehyde, respectively, and include those materials identified in United States Patent Application Publication No. 2006/0058451 at paragraph [0055], the cited portion of which being incorporated herein by reference.

Examples of other suitable aldimines include latent aliphatic polyamines. Examples of commercially-available aldimines are DESMOPHEN® PAC XP7076 and PAC XP7068. Especially preferred are isophoronediamine aldimines (IPDA aldimines), such as is commercially available as VESTAMIN® A139.

In certain embodiments, the aspartic ester-based amine-functional resin is present in an amount of at least 50 percent by weight, such as at least 70 percent by weight, at least 80 percent by weight, or, in some cases, at least 90 percent by weight, based on the sum of the weight of the aspartic ester-based amine-functional resin and the blocked primary amine. In certain embodiments, the blocked primary amine is present in an amount of less than 50 percent by weight, such as less than 30 percent by weight, less than 20 percent by weight, or, in some cases, less than 10 percent by weight, based on the sum of the weight of the aspartic ester-based amine-functional resin and the blocked primary amine.

As indicated above, the coating compositions of the present invention comprise an isocyanate-functional component. In the coating composition of the present invention, the isocyanate-functional component comprises a polyisocyanate having a functionality greater than 2.0, often 2.5 or more, and an isocyanate equivalent weight of greater than 300, often 350 or more. In some examples, the compound includes at least one non-aromatic isocyanate compound. More specifically, in some embodiments, such a polyisocyanate comprises a mixture of (i) an aliphatic polyisocyanate resin based on hexamethylene diisocyanate (HDI), such as is DESMODUR N-3800 from Bayer Materials Science; and (ii) an aliphatic polyisocyanate based on isophorone diisocyanate (IPDI) and hexamethylene diisocyanate (HDI), such as DESMODUR XP 2763 also from Bayer. In certain embodiments of such mixtures, (ii) is present in an amount of at least 50 percent by weight, such as at least 70 percent by weight, or at least 80 percent by weight, based on the sum of the weight of (i) and (ii).

In the coating compositions of the present invention, the isocyanate-functional component also comprises a silane. In one embodiment, the silane is an isocyanatosilane. Suitable isocyanatosilanes are those corresponding to formula (IV)

wherein X represents identical or different organic groups which are inert to isocyanate groups below 100° C., provided that at least two of these groups are alkoxy or acyloxy groups, such as alkyl or alkoxy groups having 1 to 4 carbon atoms and Y represents a linear or branched alkylene group containing 1 to 8 carbon atoms, such as a linear group containing 2 to 4 carbon atoms or a branched group containing 5 to 6 carbon atoms.

In some embodiments, X represents methoxy, ethoxy groups or propoxy groups and Y is a linear group containing 3 carbon atoms. Examples of suitable isocyanatosilanes include 3-isocyanatopropyl-methyldimethoxysilane, 3-isocyanatopropyl-trimethoxysilane and 3-isocyanatopropyl-triethoxysilane.

In certain embodiments, the isocyanatosilane is present in an amount of at least 1 percent by weight, such as at least 2 percent by weight, based on the total weight of isocyanate-functional components in the coating composition. In certain embodiments, the isocyanatosilane is present in an amount of no more than 10 percent by weight, such as no more than 5 percent by weight, based on the total weight of isocyanate-functional components in the coating composition.

In another embodiment, the silane is a methacryloxy silane. Suitable methacryloxy silanes for use in the present invention include, but are not limited to, methacryloxypropyltrimethoxy silane, which is commercially available as SILQUEST A-174 from Momentive Performance Materials. Other methacryloxypropyltrimethoxy silanes include Dow Corning Z-6030, Wacker Geniosil GF 31, and Shin-Etsu KBM-503. Suitable methacryloxy-functional silanes also include methacryloxymethyl-methyldimethoxysilane (Wacker Geniosil XL 32), methacryloxymethyl-trimethoxysilane (Wacker Geniosil XL 33), and methacryloxypropyl-triacetoxysilane (Wacker Genniosil GF 39).

In certain embodiments, the methacryloxy silane is present in an amount of at least 1 percent by weight, such as at least 2 percent by weight, based on the total weight of isocyanate-functional components in the coating composition. In certain embodiments, the methacryloxy silane is present in an amount of no more than 10 percent by weight, such as no more than 5 percent by weight, based on the total weight of isocyanate-functional components in the coating composition.

In certain embodiments, the coating compositions of the present invention comprise an alkoxy-functional and/or silanol-functional silicone. As used herein, the term "alkoxy-functional and/or silanol-functional silicone" refers to silicones comprising alkoxy-functional groups, —OR, and/or hydroxy-functional groups, —OH, wherein R is an alkyl group or an aryl group. As used herein, the term "silicone" refers to siloxane polymers based on a structure comprising alternate silicon and oxygen atoms. In certain embodiments, the alkoxy-functional and/or silanol-functional silicone comprises a compound represented by the general formula:

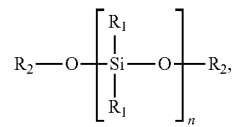

wherein each $R_1$, which may be the same or different, is selected from the group consisting of a hydroxy group, an alkyl group having up to six carbon atoms, an aryl group having up to six carbon atoms, and an alkoxy group having up to six carbon atoms; each $R_2$, which may be the same or different, is selected from the group consisting of hydrogen, an alkyl group having up to six carbon atoms, and an aryl group having up to six carbon atoms. In certain embodiments, $R_1$ and $R_2$ comprise groups having less than six carbon atoms to facilitate rapid hydrolysis, which reaction is driven by the volatility of the alcohol analog product of the hydrolysis. In certain embodiments, "n" is selected so that the foregoing silicone has a weight average molecular weight in the range of from 400 to 10,000, such as from 800 to 2,500.

Alkoxy-functional and/or silanol-functional silicones, which are suitable for use in the present invention, are commercially available and include, for example, (a) methoxy-functional polysiloxanes, such as DC-3074 and DC-3037 commercially available from Dow Corning; and GE SR191, SY-550, and SY-231 commercially available from Wacker Silicones located in Adrian, Mich.; and (b) silanol-functional polysiloxanes, such as Dow Corning's DC-840, Z6018, Q1-2530 and 6-2230.

In certain embodiments, the previously described alkoxy-functional and/or silanol-functional silicone is present in the coating compositions of the present invention in an amount ranging from 5 to 80 percent by weight, such as 10 to 30 percent by weight, or, in some cases, 10 to 25 percent by weight, with the weight percents being based on the total weight of the coating composition.

In addition, other ingredients useful in forming the coating compositions of this invention include organic solvents, plasticizers, extenders, fillers, hydrocarbon resin modifiers, and various types of additives, such as UV stabilizers, pigment wetting agents, flow and leveling additives, thixatropes, defoamers, and the like.

Organic solvents can be added if desired. Suitable solvents include esters, ethers, ketones, glycols, and the like. Other suitable solvents include aromatic solvents, such as xylene. In certain embodiments, the coating compositions of the present invention comprise up to about 25 percent by weight organic solvent, based on the total weight of the coating composition. In other embodiments, however, the coating compositions are substantially free of organic solvent, which, as used herein, refers to coating compositions comprising 5 percent or less or, in some cases, 2 percent or less, or 1 percent or less, of organic solvent, based on the total weight of the coating composition.

As previously indicated, the coating compositions of the present invention are, in certain embodiments, supplied as a two-component or two-package system. Generally speaking, Part "A" or a first package or component includes the isocyanate-functional component and Part "B" or a second package or component includes the amine-functional component. Part "A" and Part "B" are mixed together prior to application.

The volume ratio of the isocyanate-functional component to the amine-functional component in a mixing device may be any suitable volume mixing ratio capable of being applied to a substrate, such as at 1:1, or, in some cases, less than 1:1, such as 1:2.

Various application/mixing devices known in the art can be used to apply the compositions of the present invention. One suitable application device is commonly known in the industry as a "static mix tube" applicator. In such a static mix tube, the isocyanate component and the amine component are each stored in a separate chamber or container. As pressure is applied, each of the components is brought into a mixing tube. Mixing of the components is effected by way of the torturous or cork screw pathway within the tube. The exit end of the tube may have atomization capability useful in spray application of the reaction mixture.

The ratio of equivalents of isocyanate groups to amine groups may be selected to control the rate of cure of the coating composition, thereby affecting adhesion. In certain embodiments, the ratio of the equivalents of isocyanate groups to amine groups (also known as the reaction index) is greater than one, such as 1.01 to 1.10:1, or 1.03 to 1.10, or 1.05 to 1.08.

As indicated earlier, the present invention is also directed to composite coating systems. These coating systems comprise a first coating layer and a second coating layer deposited over at least a portion of the first coating layer. In these coating systems, the first coating layer is deposited from a composition comprising at least 70%, such as at least 75%, or, in some cases, at least 80% by weight zinc particles, based on the total solids weight of the coating composition. The second coating layer is deposited from a coating composition of the type described above.

The particle size of the zinc particles can vary. In addition, the shape (or morphology) of the zinc particles can vary. For example, generally spherical morphologies can be used, as well as particles that are cubic, platy, or acicular (elongated or fibrous). In some cases, the zinc particles comprise "zinc powder", which, as used herein, refers to generally spherical particles having an average particle size of no more than 20 microns, such as 2 to 16 microns. In some cases, the zinc particles comprise "zinc dust", which, as used herein, refers to zinc powder having an average particle size of 2 to 10 microns. In some cases, zinc particles comprise zinc flakes, which, as used herein, refers to particles having a different aspect ratio than powder or dust (i.e., not a generally spherical structure) and having an elongated dimension of up to 100 microns. In some cases, mixtures of zinc powder, dust, and/or flakes are used.

In certain embodiments of these coating systems of the present invention, the first coating layer and the second coating layer are based on the same binder chemistry, namely polyurea chemistry. In some of these embodiments, the first coating layer comprises an isocyanate-functional component and an amine-functional component, wherein the amine-functional component comprises an aspartic ester-based amine-functional resin. In certain embodiments, the amine-functional component comprises a blocked primary amine, such as any of those mentioned earlier. Moreover, in some of these embodiments, the isocyanate-functional component comprises a polyisocyanate having a functionality greater than 2.0 and an isocyanate equivalent weight of greater than 300, and, optionally, a silane, including any of those described above. In the coating systems of the present invention, the second coating layer is deposited from a coating composition of the type described above.

Coatings and coating systems of this invention can be applied to a desired substrate surface to protect it from weathering, impact, and exposure to corrosion and/or chemicals. Illustrative of substrates that can be treated using compositions of this invention include wood, plastic, concrete, vitreous surfaces, and metallic surfaces.

The coating compositions described herein are often applied in films of from 50 to 250 micrometers, or in some embodiments, up to 1.2 millimeters in thickness. If necessary, multiple layers can be applied to the surface to be protected.

The following Examples are presented to demonstrate the general principles of the invention. The invention should not be considered as limited to the specific Examples presented. All parts are described in percent by weight, based on the total weight of the illustrated mixture, and percent by volume unless otherwise indicated.

EXAMPLES

Example A

An amine-functional component was prepared from the following mixture of ingredients as described below:

TABLE 1

| Ingredient | Percent by weight | Percent by volume |
|---|---|---|
| Desmophen NH 1420[1] | 23.40 | 36.00 |
| Disperbyk-163[2] | 0.86 | 1.40 |
| Byk-A-530[3] | 0.94 | 1.90 |
| Suspeno #201-NBA[4] | 0.52 | 0.96 |
| Bentone SD-2[5] | 0.56 | 0.56 |
| Byk-410[6] | 0.82 | 1.20 |
| UOP-L-Powder[7] | 4.50 | 3.40 |
| TiO$_2$ TR-93[8] | 44.30 | 18.10 |
| SZP-391 JM[9] | 5.10 | 2.50 |
| Vestamin A 139[10] | 7.50 | 14.10 |
| Resamin HF 480[11] | 3.60 | 5.40 |
| Tefo Glide 450[12] | 1.00 | 1.50 |
| Eastman EEP[13] | 1.10 | 2.10 |
| N-Butyl Acetate | 4.60 | 8.60 |
| Eversorb 93[14] | 0.60 | 1.00 |
| Tinuvin 1130[15] | 0.60 | 0.80 |

[1]Amine-functional aspartic acid ester, commercially available from Bayer Materials Science.
[2]Wetting and dispersing additive, commercially available from BYK.
[3]Silicone polymer air release additive, commercially available from BYK.
[4]Rheology modifier, commercially available from Poly-Resyn, Inc.
[5]Dispersible rheological additive, commercially available from Elementis.
[6]Liquid rheology additive, commercially available from BYK.
[7]Potassium calcium sodium aluminosilicate, commercially available from A.B. Colby, Inc.
[8]Titanium dioxide, commercially available from Huntsman.
[9]Strontium Zinc Phosphosilicate, commercially available from Halox.
[10]An cycloaliphatic diamine, commercially available from Evonik.
[11]Carbamic resin based on butylurethane and formaldehyde, commercially available from Cytec.
[12]Polyether siloxane copolymer, commercially available from Evonik.
[13]Ethyl 3-Ethoxypropionate, commercially available from Eastman.
[14]Amine light stabilizer, commercially available from Everlight Chemical.
[15]UV absorber of the hydroxyphenylbenzotriazole class, commercially available from Ciba.

Desmophen NH 1420 was placed and charged in a clean vessel. Disperbyk-163 and Byk-A-530 were added while slowly mixing the contents of the vessel. After mixing the contents of the vessel for 5 minutes, Suspeno #201-NBA was added and mixed for 10 minutes. Bentone SD-2 was then added to the vessel and mixed under high speed. After reducing the mixing speed, Byk-410 was added. UOP-L-Powder, TiO$_2$ TR-93, and SZP-391 JM were then added and mixed under high shear conditions to achieve a 6H minimum grind. At this point, Vestamin A 139 and Resamin HF 480 were added and mixed for 10 minutes. Finally, Tefo Glide 450, Eastman EEP, N-Butyl Acetate, Eversorb 93, and Tinuvin 1130 were added under slow agitation and mixed for 15 minutes.

Example B

An isocyanate-functional component comprising an isocyanatosilane was prepared from the following mixture of ingredients as described below:

TABLE 2

| Ingredient | Percent by weight | Percent by volume |
|---|---|---|
| Desmodur XP-2763[1] | 74.90 | 73.50 |
| Desmodur N-3800[2] | 9.60 | 8.90 |

TABLE 2-continued

| Ingredient | Percent by weight | Percent by volume |
|---|---|---|
| A-Link 35[3] | 3.70 | 3.60 |
| N-Butyl Acetate | 11.80 | 14.00 |

[1]Aliphatic polyisocyanate based on isophorone diisocyanate (IPDI) and hexamethylene diisocyanate (HDI), commercially available from Bayer Material Science.
[2]Flexibilizing aliphatic polyisocyanate resin based on hexamethylene diisocyanate (HDI), commercially available from Bayer Material Science.
[3]3-isocyantopropyltrimethoxysilane, commercially available from Momentive.

Desmodur XP-2763, Desmodur N-3800, A-Link 35, and N-Butyl Acetate were added to a vessel under a nitrogen purge and slow agitation. The contents were stirred for 15-20 minutes to achieve a homogenous mixture.

Example C

The isocyanate-functional component comprising a methacryloxy silane was prepared from the following mixture of ingredients as described below:

TABLE 3

| Ingredient | Percent by weight | Percent by volume |
|---|---|---|
| Desmodur XP-2763[1] | 79.60 | 79.10 |
| Desmodur N-3800[2] | 9.50 | 8.90 |
| Silquest A-174[3] | 4.90 | 5.00 |
| N-Butyl Acetate | 6.00 | 7.00 |

[1]Aliphatic polyisocyanate based on isophorone diisocyanate (IPDI) and hexamethylene diisocyanate (HDI), commercially available from Bayer Material Science.
[2]Flexibilizing aliphatic polyisocyanate resin based on hexamethylene diisocyanate (HDI), commercially available from Bayer Material Science.
[3]gamma-Methacryloxypropyltrimethoxysilane, commercially available from Momentive.

Desmodur XP-2763, Desmodur N-3800, Silquest A-174, and N-Butyl Acetate were added to a vessel under a nitrogen purge and slow agitation. The contents were stirred for 15-20 minutes to achieve a homogenous mixture.

Examples 1-3

Polyurea coating compositions were prepared by combining the amine-functional component of Example A with the isocyanate-functional component of Examples B and C. Example 1 illustrates a coating composition prepared by combining the amine-functional component of Example A with the isocyanate-functional component comprising the isocyanatosilane of Example B. Example 2 illustrates a coating composition prepared by combining the amine-functional component of Example A with the isocyanate-functional component comprising the methacryloxy silane of Example C. A comparative example (Example 3) was also applied in the manner described above. In the comparative example, the isocyanate component used in the coating composition did not contain a silane containing functional group.

The coating compositions were produced by mixing a 1:1 volume ratio of the amine-functional component to the isocyanate-functional component. The coating compositions were sprayed to 16 gauge mild carbon steel (ASTM A-36) panels. For all coatings, 10 mil wet film thickness dried based on touch in 1.5 hours at 35° F. and in 0.50 hours at 75° F. A 10 mil wet film thickness completely hardened in 4.5 hours at 35° F. and in 1.25 hours at 75° F.

The polyurea compositions were tested for corrosion resistance according to ASTM B117 (Salt Spray Test). In accordance with ASTM B117, the coated substrates were scribed with a knife to expose the bare substrate. The scribed coated substrates were then exposed to a salt spray environment for 720 hours. After 720 hours, the scribed coated substrates were measured for corrosion along the scribe. The average scribe creep was between 2.4 and 2.9 millimeters.

The compositions were also tested for adhesion in accordance with ASTM D3359. As shown in Table 4, the polyurea coating compositions with isocyanate-functional components comprising a silane containing functional group exhibited superior adhesion to substrates compared to comparable coating compositions with an isocyanate-functional component not made with a silane containing functional group (Example 3).

TABLE 4

| Example | Dried Film Thickness (mils) | Adhesion |
|---------|-----------------------------|----------|
| 1 | 13-15 | 5B |
| 2 | 11-12 | 5B |
| 3 (comparative example) | 10-12 | 0B |

While the preferred embodiments of the present invention are described above, obvious modifications and alterations of the present invention may be made without departing from the spirit and scope of the present invention. The scope of the present invention is defined in the appended claims and equivalents thereto.

We claim:

1. A polyurea coating composition comprising:
   (a) an amine-functional component comprising:
      (i) an aspartic ester-based amine-functional resin, and
      (ii) a blocked primary amine comprising a blocked isophoronediamine; and
   (b) an isocyanate-functional component comprising:
      (i) a polyisocyanate having a functionality greater than 2.0 and an isocyanate equivalent weight of greater than 300, and
      (ii) a silane comprising an isocyanatosilane or a methacryloxy silane, wherein the silane is present in an amount of at least 1 percent by weight, based on the total weight of isocyanate-functional components in the coating composition and no more than 10 percent by weight, based on the total weight of isocyanate-functional components in the coating composition,
   wherein the ratio of the equivalents of isocyanate groups to amine groups is 1.01:1 to 1.10:1.

2. The polyurea coating composition of claim 1, wherein the aspartic ester-based amine-functional resin is present in an amount of at least 80 percent by weight, based on the sum of the weight of the aspartic ester-based amine-functional resin and the blocked primary amine.

3. The polyurea coating composition of claim 1, wherein the aspartic ester-based amine-functional resin is present in an amount of at least 90 percent by weight, based on the sum of the weight of the aspartic ester-based amine-functional resin and the blocked primary amine.

4. The polyurea coating composition of claim 1, wherein the polyisocyanate having a functionality of greater than 2.0 and an isocyanate equivalent weight of greater than 300 comprises a mixture comprising:
   (A) an aliphatic polyisocyanate resin based on hexamethylene diisocyanate; and
   (B) an aliphatic polyisocyanate based on isophorone diisocyanate and hexamethylene diisocyanate.

5. The polyurea coating composition of claim 4, wherein (B) of the polyisocyanate mixture is present in an amount of at least 70 percent by weight, based on the sum of the weight of (A) and (B).

6. The polyurea coating composition of claim 1, wherein the isocyanatosilane corresponds to the formula:

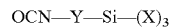

$$OCN-Y-Si-(X)_3$$

wherein X represents an alkyl or alkoxy group having 1 to 4 carbon atoms and Y represents a linear or branched alkylene group containing 1 to 8 carbon atoms.

7. The polyurea coating composition of claim 6, wherein X represents methoxy, ethoxy or propoxy and Y is a linear group containing 3 carbon atoms.

8. The polyurea coating composition of claim 1, further comprising an alkoxy-functional and/or silanol-functional silicone.

9. A composite polyurea coating system comprising:
   (I) a first coating layer; and
   (II) a second coating layer deposited over at least a portion of the first coating layer, wherein the first coating layer and the second coating layer each independently comprise the cured reaction product of a composition comprising:
      (a) an amine-functional component comprising:
         (i) an aspartic ester-based amine-functional resin, and
         (ii) a blocked primary amine comprising a blocked isophoronediamine; and
      (b) an isocyanate-functional component comprising:
         (i) a polyisocyanate having a functionality greater than 2.0 and an isocyanate equivalent weight of greater than 300, and
         (ii) a silane comprising an isocyanatosilane or a methacryloxy silane, wherein the silane is present in an amount of at least 1 percent by weight, based on the total weight of isocyanate-functional components in the composition and no more than 10 percent by weight, based on the total weight of isocyanate-functional components in the coating composition; and
   wherein the first coating layer further comprises at least 70% by weight zinc, based on the total solids weight of the coating composition.

10. The coating system of claim 9, wherein the ratio of the equivalents of isocyanate groups to amine groups is 1.01:1 to 1.10:1.

11. A method of applying a polyurea coating system to a substrate comprising:
   mixing a first coating composition comprising (a) an amine-functional component comprising an aspartic ester-based amine-functional resin and a blocked isophoronediamine with (b) an isocyanate-functional component comprising a polyisocyanate having a functionality greater than 2.0 and an isocyanate equivalent weight of greater than 300, and a silane comprising an isocyanatosilane or a methacryloxy silane,
      wherein the silane is present in an amount of at least 1 percent by weight, based on the total weight of isocyanate-functional components in the composition and no more than 10 percent by weight, based on the total weight of isocyanate-functional components in the coating composition,
      wherein the volume mixing ratio of the isocyanate functional component to the amine-functional component is capable of being applied to the substrate from 1:1 to 1:3, and wherein the first coating composition further comprises at least 70% by weight zinc, based on the total solids weight of the coating composition; and applying the mixed first coating composition to the substrate to form a first cured reaction product.

12. The method of claim 11, further comprising:

mixing a second coating composition comprising (a) an amine-functional component comprising an aspartic ester-based amine-functional resin and a blocked primary isophoronediamine with (b) an isocyanate-functional component comprising a polyisocyanate having a functionality greater than 2.0 and an isocyanate equivalent weight of greater than 300, and a silane comprising an isocyanatosilane or a methacryloxy silane, wherein the silane is present in an amount of at least 1 percent by weight, based on the total weight of isocyanate-functional components in the composition and no more than 10 percent by weight, based on the total weight of isocyanate-functional components in the coating composition, wherein the volume mixing ratio of the isocyanate functional component to the amine-functional component is capable of being applied to the substrate from 1:1 to 1:3; and applying the mixed second coating composition to the substrate over the first cured reaction product to form a second cured reaction product.

* * * * *